United States Patent
Lacy et al.

(10) Patent No.: US 9,015,944 B2
(45) Date of Patent: Apr. 28, 2015

(54) METHOD OF FORMING A MICROCHANNEL COOLED COMPONENT

(71) Applicant: General Electric Company, Schenectady, NY (US)

(72) Inventors: Benjamin Paul Lacy, Greer, SC (US); Paul Stephen Dimascio, Greer, SC (US); Srikanth Chandrudu Kottilingam, Simpsonville, SC (US); David Edward Schick, Greenville, SC (US)

(73) Assignee: General Electric Company, Schenectady, NY (US)

(*) Notice: Subject to any disclaimer, the term of this patent is extended or adjusted under 35 U.S.C. 154(b) by 331 days.

(21) Appl. No.: 13/774,275

(22) Filed: Feb. 22, 2013

(65) Prior Publication Data

US 2014/0237784 A1   Aug. 28, 2014

(51) Int. Cl.
*B23P 15/00* (2006.01)
*B23P 17/00* (2006.01)
*B23P 15/02* (2006.01)
*F23R 3/00* (2006.01)

(52) U.S. Cl.
CPC .............. *B23P 15/00* (2013.01); *Y10T 29/302* (2015.01); *Y10T 29/49234* (2015.01); *Y10T 29/49906* (2015.01); *F23R 3/002* (2013.01); *F23R 2900/00018* (2013.01); *B23P 17/00* (2013.01); *B23P 15/02* (2013.01); *B23P 2700/13* (2013.01)

(58) Field of Classification Search
CPC ...... B21D 53/02; B21D 53/04; B21D 26/021; B23P 15/00; B23P 15/02; B23P 17/00; B23P 2700/13; B23P 15/26; B23P 19/10; F23R 3/00; F23R 2900/00018; Y10T 19/302; Y10T 29/49906; Y10T 29/49234

See application file for complete search history.

(56) References Cited

U.S. PATENT DOCUMENTS

| | | | |
|---|---|---|---|
| 3,803,688 A * | 4/1974 | Peck | 29/890.032 |
| 4,988,266 A | 1/1991 | Nakamura et al. | |
| 5,957,657 A | 9/1999 | Akita et al. | |
| 6,223,524 B1 | 5/2001 | Durcan | |
| 6,461,108 B1 | 10/2002 | Lee et al. | |
| 6,528,118 B2 | 3/2003 | Lee et al. | |
| 6,679,680 B2 | 1/2004 | Um et al. | |
| 6,899,518 B2 | 5/2005 | Lucas et al. | |
| 7,284,954 B2 | 10/2007 | Parker et al. | |
| 7,487,641 B2 | 2/2009 | Frechette et al. | |
| 7,653,994 B2 | 2/2010 | Dasilva et al. | |
| 7,900,458 B2 | 3/2011 | James et al. | |
| 2002/0106457 A1 | 8/2002 | Lee et al. | |
| 2004/0101655 A1* | 5/2004 | Bryans et al. | 428/119 |
| 2007/0205189 A1 | 9/2007 | Grossklaus et al. | |
| 2009/0031564 A1 | 2/2009 | Meier | |
| 2009/0053045 A1 | 2/2009 | Nowak et al. | |
| 2009/0255117 A1 | 10/2009 | Hovel et al. | |

(Continued)

*Primary Examiner* — Alexander P Taousakis
(74) *Attorney, Agent, or Firm* — Cantor Colburn LLP

(57) ABSTRACT

A method of forming a microchannel cooled component is provided. The method includes forming at least one microchannel within a surface of a relatively planar plate. The method also includes placing a relatively planar cover member over the surface having the at least one microchannel formed therein. The method further includes adhering the relatively planar cover member to the relatively planar plate. The method yet further includes curving the microchannel cooled component by pressing the relatively planar cover member with a forming component for at least a portion of a time period of adhering the relatively planar cover member to the relatively planar plate.

20 Claims, 4 Drawing Sheets

(56) References Cited

U.S. PATENT DOCUMENTS

| | | | |
|---|---|---|---|
| 2010/0300115 A1* | 12/2010 | Morimoto et al. | 60/796 |
| 2012/0057969 A1 | 3/2012 | Jiang et al. | |
| 2012/0114912 A1 | 5/2012 | Bunker et al. | |
| 2013/0309523 A1* | 11/2013 | Sugai et al. | 428/600 |

* cited by examiner

METHOD OF FORMING A MICROCHANNEL COOLED COMPONENT

BACKGROUND OF THE INVENTION

The subject matter disclosed herein relates to turbine systems, and more particularly to a method of forming a microchannel cooled component for such turbine systems.

In gas turbine systems, a combustor converts the chemical energy of a fuel or an air-fuel mixture into thermal energy. The thermal energy is conveyed by a fluid, often compressed air from a compressor, to a turbine where the thermal energy is converted to mechanical energy. As part of the conversion process, hot gas is flowed over and through portions of the turbine as a hot gas path. High temperatures along the hot gas path can heat turbine components, causing degradation of components.

Efforts to cool or maintain suitable temperatures for turbine components have included providing channels of various sizes to distribute a cooling flow within the turbine components. Difficulties exist when forming turbine components having such channels, particularly turbine components that require some degree of curvature.

BRIEF DESCRIPTION OF THE INVENTION

According to one aspect of the invention, a method of forming a microchannel cooled component is provided. The method includes forming at least one microchannel within a surface of a relatively planar plate. The method also includes placing a relatively planar cover member over the surface having the at least one microchannel formed therein. The method further includes adhering the relatively planar cover member to the relatively planar plate. The method yet further includes curving the microchannel cooled component by pressing the relatively planar cover member with a forming component for at least a portion of a time period of adhering the relatively planar cover member to the relatively planar plate.

According to another aspect of the invention, a method of forming a microchannel cooled component is provided. The method includes forming at least one microchannel within a surface of a relatively planar plate. The method also includes placing a relatively planar cover member over the surface having the at least one microchannel formed therein. The method further includes heating the relatively planar plate and the relatively planar cover member to adhere the relatively planar cover member to the relatively planar plate. The method yet further includes curving the microchannel cooled component by pressing the relatively planar cover member with a forming component while simultaneously heating the relatively planar plate and the relatively planar cover member.

According to yet another aspect of the invention, a method of forming a microchannel cooled component is provided. The method includes adhering a cover member to a plate, at least one of the cover member and the plate having at least one microchannel formed therein. The method also includes curving the microchannel cooled component by pressing the cover member with a forming component while simultaneously adhering the cover member to the plate.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
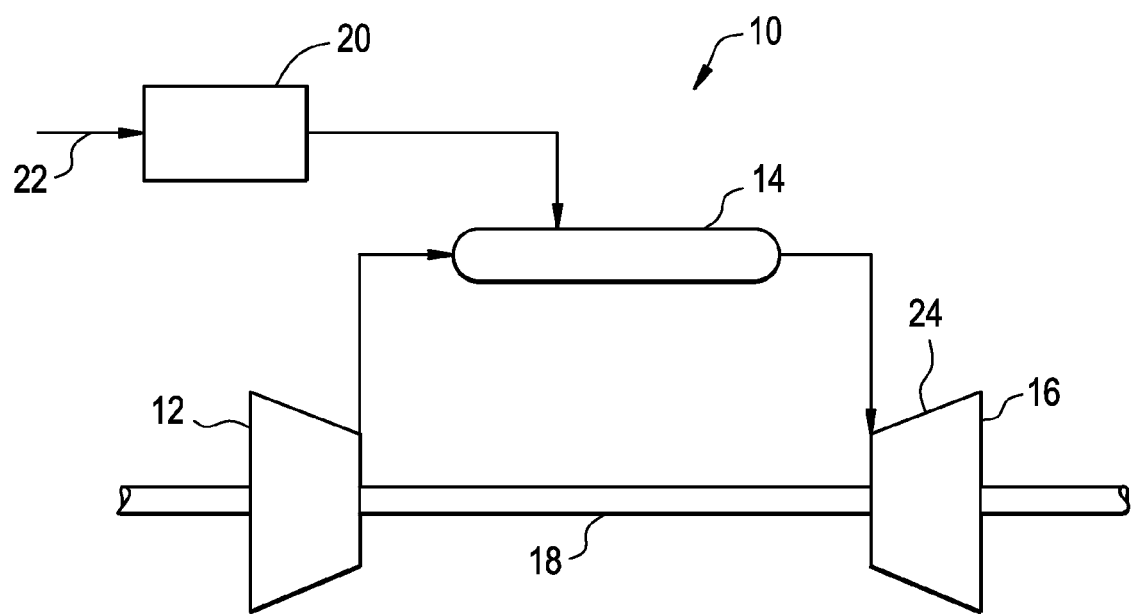
FIG. 1 is a schematic illustration of a turbine system.

Referring to FIG. 1, a turbine system, such as a gas turbine system is schematically illustrated and generally referred to with numeral 10. The gas turbine system 10 includes a compressor 12, a combustor 14, a turbine 16, a shaft 18 and a fuel nozzle 20. It is to be appreciated that one embodiment of the gas turbine system 10 may include a plurality of compressors 12, combustors 14, turbines 16, shafts 18 and fuel nozzles 20. The compressor 12 and the turbine 16 are coupled by the shaft 18. The shaft 18 may be a single shaft or a plurality of shaft segments coupled together to form the shaft 18.

The combustor 14 uses a combustible liquid and/or gas fuel, such as natural gas or a hydrogen rich synthetic gas, to run the gas turbine system 10. For example, fuel nozzles 20 are in fluid communication with an air supply and a fuel supply 22. The fuel nozzles 20 create an air-fuel mixture, and discharge the air-fuel mixture into the combustor 14, thereby causing a combustion that creates a hot pressurized exhaust gas. The combustor 14 directs the hot pressurized gas through a transition piece into a turbine nozzle (or "stage one nozzle"), and other stages of buckets and nozzles causing rotation of the turbine 16 within a turbine casing 24. Rotation of the turbine 16 causes the shaft 18 to rotate, thereby compressing the air as it flows into the compressor 12. In an embodiment, hot gas path components are located in the turbine 16, where hot gas flow across the components causes creep, oxidation, wear and thermal fatigue of turbine components. Controlling the temperature of the hot gas path components can reduce distress modes in the components. The efficiency of the gas turbine system 10 increases with an increase in firing temperature and the hot gas path components may need additional or increased cooling to meet service life and to effectively perform intended functionality.

Figure 2:
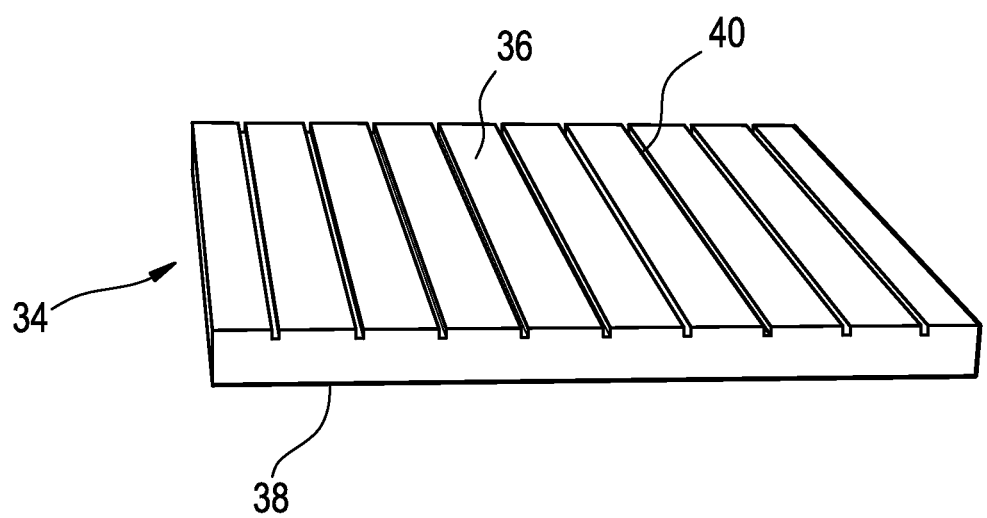
FIG. 2 is a perspective view of a plate having a plurality of microchannels formed therein.
Figure 3:
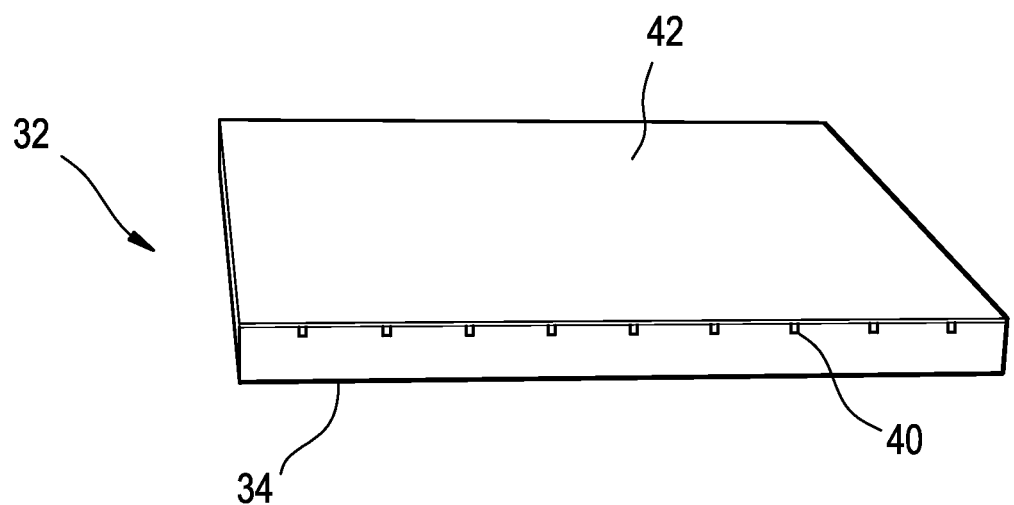
FIG. 3 is a perspective view of a cover member placed over the plate.

Referring to FIGS. 2 and 3, as noted above, various hot gas components are located throughout the gas turbine system 10, such as in the turbine 16. Examples of hot gas path components include a turbine shroud, a turbine nozzle and a turbine bucket, however, the preceding examples are merely illustrative and not intended to be limiting. One such component is generally shown as a microchannel cooled component 32. The microchannel cooled component 32 comprises a relatively planar plate 34 (FIG. 2) that is substantially flat. The relatively planar plate 34 includes a first surface 36 and a second surface 38. Although the plate is described herein as a relatively planar member, it is to be appreciated that a curved or twisted member may be employed.

The first surface 36 of the relatively planar plate 34 includes at least one, but typically a plurality of microchannels 40 formed within the first surface 36 of the relatively planar plate 34. The plurality of microchannels 40 may be the same or different in size or shape from each other. In accordance with certain embodiments, the plurality of microchannels 40 may have a width of between about 100 microns (μm) and about 3 millimeters (mm) and a depth between about 100 μm and about 3 mm, as will be discussed below. For example, the plurality of microchannels 40 may have a width and/or depth between about 150 μm and about 1.5 mm, between about 250 μm and about 1.25 mm, or between about 300 μm and about 1 mm. In certain embodiments, the plurality of microchannels 40 may have a width and/or depth of less than about 50, 100, 150, 200, 250, 300, 350, 400, 450, 500, 600, 700, or 750 μm. The plurality of microchannels 40 may have circular, semi-circular, oval, curved, rectangular, triangular, or rhomboidal cross-sections. The preceding list is merely illustrative and is not intended to be exhaustive. The width and depth could vary throughout its length. Additionally, in certain embodiments, the plurality of microchannels 40 may have varying cross-sectional areas. Heat transfer enhancements such as turbulators or dimples may be installed in the plurality of microchannels 40 as well.

The microchannel cooled component 32 also includes a relatively planar cover member 42 (FIG. 3) disposed over the first surface 36 of the relatively planar plate 34, and more specifically over the plurality of microchannels 40 to at least partially enclose the plurality of microchannels 40. Although the cover member is described herein as a relatively planar member, it is to be appreciated that the cover member may comprise a curved or twisted geometry. The relatively planar cover member 42 may be formed of various suitable materials. In one embodiment, the relatively planar cover member 42 comprises one or more layers of pre-sintered preform (PSP) foils. In another embodiment, the relatively planar cover member 42 comprises one or more layers of sheet metal. It is further contemplated that the relatively planar cover member 42 may be formed of both PSP foil(s) and one or more layers of sheet metal. The relatively planar cover member 42 is substantially flat in such a way to form a flush engagement with the first surface 36 of the relatively planar plate 34. A flush engagement provides effective sealing and enclosure of the plurality of microchannels 40. It is contemplated that the plurality of microchannels 40 is formed in the relatively planar cover member 42 as an alternative to, or in combination with, microchannels formed in the relatively planar plate 34.

Figure 5:
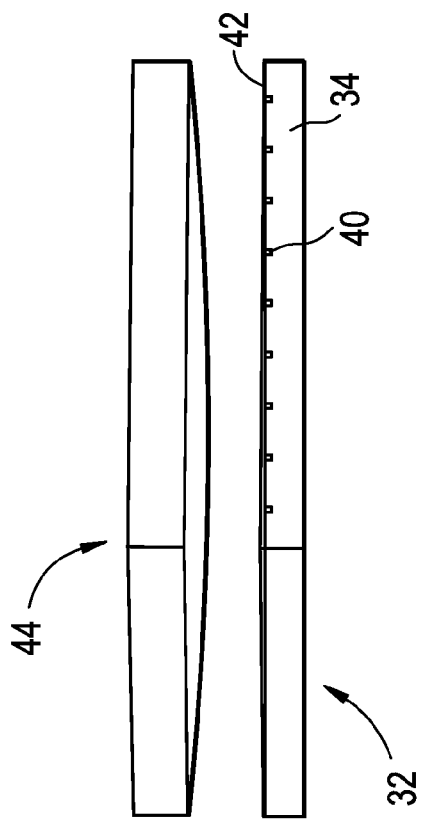
FIG. 5 is a perspective view of the forming component and the plate prior to pressing of the forming component into a microchannel cooled component.
Figure 4:
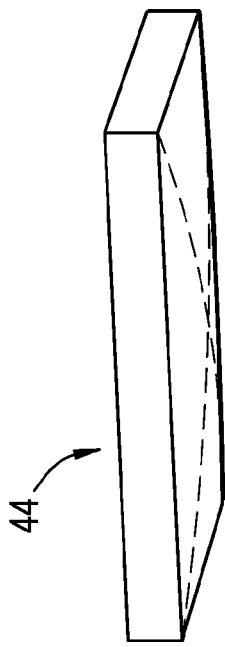
FIG. 4 is a perspective view of a forming component.
Figure 6:
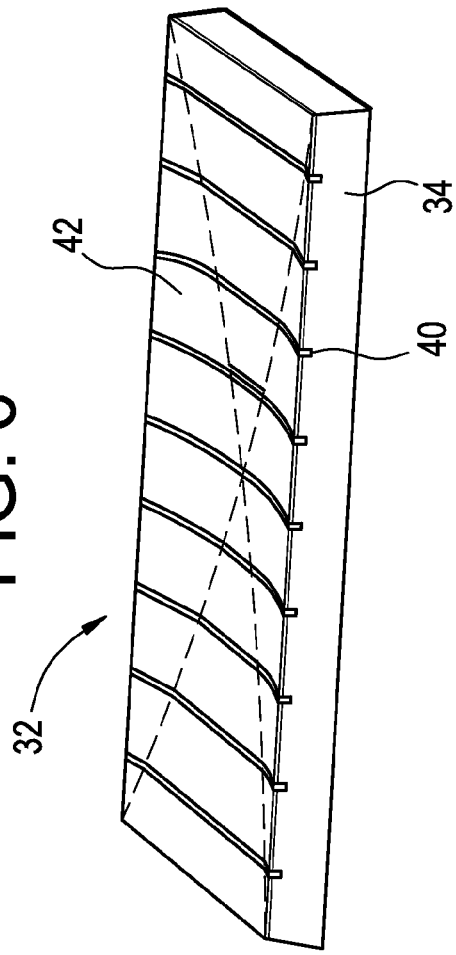
FIG. 6 is a perspective view of the microchannel cooled component.
Figure 7:
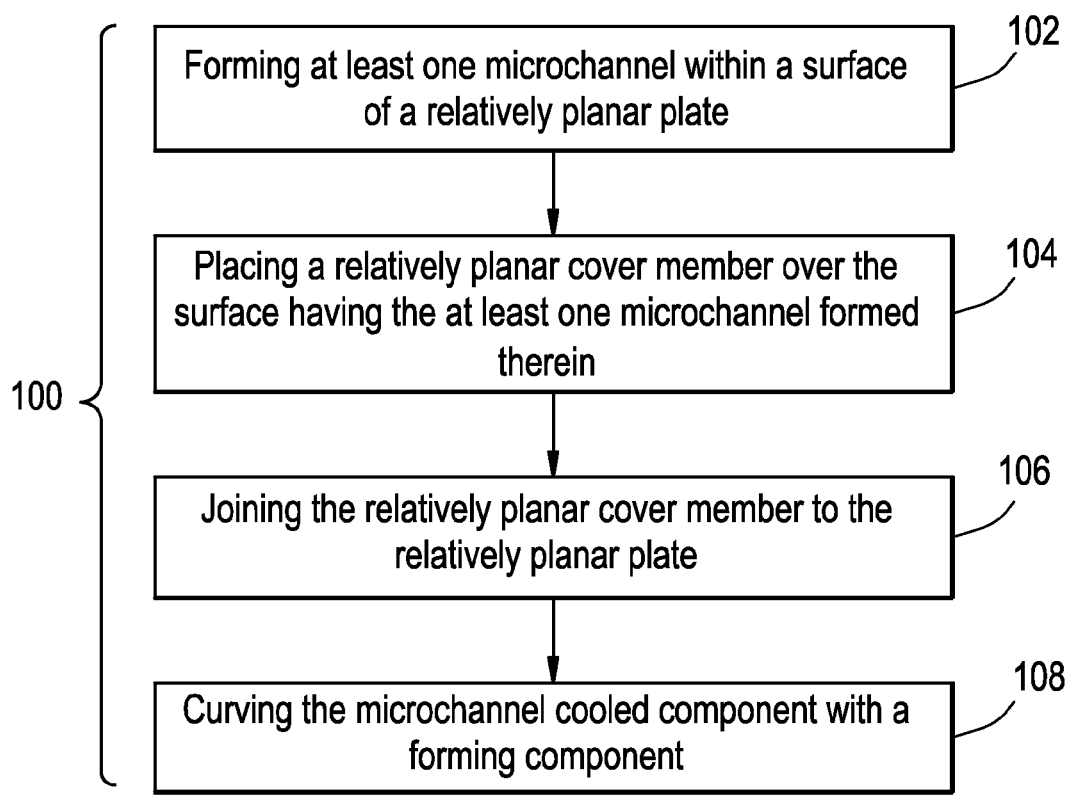
FIG. 7 is a flow diagram illustrating a method of forming the microchannel cooled component.

As illustrated in the flow diagram of FIG. 7, and with reference to FIGS. 1-6, a method of forming a microchannel cooled component 100 is also provided. The gas turbine system 10, and more specifically the microchannel cooled component 32 have been previously described and specific structural components need not be described in further detail. The method of forming a microchannel cooled component 100 includes forming at least one microchannel within a surface of a relatively planar plate 102. A relatively planar cover member is placed over the surface having the at least one microchannel formed therein 104. As described above, the substantially flat geometry of the relatively planar cover member 42 and the first surface 36 of the relatively planar plate 34 ensures a flush engagement between the two components prior to assembly.

The relatively planar cover member is joined to the relatively planar plate 106. This may be accomplished in a number of manners. An adhesion process such as brazing is an exemplary process employed in carrying out the method. In one embodiment, the relatively planar cover member 42 is adhered to the relatively planar plate 34 in a furnace brazing process and the adhesion may be completed over one or a plurality of furnace cycles. Irrespective of the precise brazing process, at least a portion of the microchannel cooled component 32 is heated during adhesion, thereby increasing the malleability of the relatively planar plate 34 and the relatively planar cover member 42. It is to be understood that any bonding process may be employed in addition to, or in combination with, brazing. Such bonding processes include diffusion bonding and friction welding, for example, but numerous other bonding techniques may be suitable.

During at least a portion of the time period of the adhesion process, and more specifically the heating of the microchannel cooled component, curving of the microchannel cooled component 108 may be achieved. A forming component 44 (FIG. 4) having a non-planar, such as a curved, geometry is pressed into a portion of the microchannel cooled component 32. FIG. 5 illustrates a state just prior to pressing of the forming component 44 into the relatively planar cover member 42 and indirectly the relatively planar plate 34. By pressing the forming component 44 into the microchannel cooled component 32 while in a heated state, a curved, or non-planar overall geometry of the microchannel cooled component 32 is achieved (FIG. 6). It is to be appreciated that a plurality of forming components may be employed at the same or distinct times to impart a desired geometry of the microchannel cooled component 32. It can be appreciated that numerous forming components may be employed simultaneously or in succession to form more complex geometries for the microchannel cooled component 32.

Advantageously, the method of forming the microchannel cooled component 100 allows the plurality of microchannels 40 to be formed in a substantially flat region, such as the first surface 36 of the relatively planar plate 34, thereby avoiding difficulties associated with microchannel formation processes within a non-planar surface. Additionally, curvature of the microchannel cooled component 32 may be achieved simultaneously and efficiently while the plurality of microchannels 40 is covered by the relatively planar cover member 42.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of forming a microchannel cooled component comprising:
    forming at least one microchannel within a surface of a relatively planar plate;
    placing a relatively planar cover member over the surface having the at least one microchannel formed therein;
    adhering the relatively planar cover member to the relatively planar plate; and
    curving the microchannel cooled component by pressing the relatively planar cover member with a forming component for at least a portion of a time period of adhering the relatively planar cover member to the relatively planar plate.

2. The method of claim 1, wherein placing the relatively planar cover member comprises placing a pre-sintered preform foil layer over the surface.

3. The method of claim 1, wherein placing the relatively planar cover member comprises placing a plurality of pre-sintered preform foil layers over the surface.

4. The method of claim 1, wherein placing the relatively planar cover member over the surface comprises placing a sheet of metal over the surface.

5. The method of claim 1, wherein placing the relatively planar cover member over the surface comprises placing a plurality of sheets of metal over the surface.

6. The method of claim 1, wherein placing the relatively planar cover member over the surface comprises placing a pre-sintered preform foil layer and a sheet of metal over the surface.

7. The method of claim 1, wherein adhering the relatively planar cover member to the relatively planar plate comprises at least one of: brazing, diffusion bonding, and friction welding.

8. The method of claim 7, wherein adhering the relatively planar cover member to the relatively planar plate comprises furnace brazing in a furnace cycle.

9. The method of claim 7, wherein brazing the relatively planar cover member to the relatively planar plate comprises furnace brazing in a plurality of furnace cycles.

10. The method of claim 1, wherein curving the microchannel cooled component comprises pressing multiple forming components into the relatively planar cover member.

11. The method of claim 1, wherein the microchannel cooled component comprises a gas turbine engine component.

12. The method of claim 11, wherein the gas turbine engine component comprises a turbine shroud.

13. A method of forming a microchannel cooled component comprising:
    forming at least one microchannel within a surface of a relatively planar plate;
    placing a relatively planar cover member over the surface having the at least one microchannel formed therein;
    heating the relatively planar plate and the relatively planar cover member to adhere the relatively planar cover member to the relatively planar plate; and
    curving the microchannel cooled component by pressing the relatively planar cover member with a forming component while simultaneously heating the relatively planar plate and the relatively planar cover member.

14. The method of claim 13, wherein placing the relatively planar cover member comprises placing a pre-sintered preform foil layer over the surface.

15. The method of claim 13, wherein placing the relatively planar cover member over the surface comprises placing a sheet of metal over the surface.

16. The method of claim 13, wherein placing the relatively planar cover member over the surface comprises placing a pre-sintered preform foil layer and a sheet of metal over the surface.

17. The method of claim 13, wherein heating the relatively planar plate and the relatively planar cover member to adhere the relatively planar cover member to the relatively planar plate comprises brazing the relatively planar cover member to the relatively planar plate.

18. The method of claim 17, wherein brazing the relatively planar cover member to the relatively planar plate comprises furnace brazing.

19. The method of claim 13, wherein the microchannel cooled component comprises a gas turbine engine component.

20. A method of forming a microchannel cooled component comprising:
    adhering a cover member to a plate, at least one of the cover member and the plate having at least one microchannel formed therein; and
    curving the microchannel cooled component by pressing the cover member with a forming component while simultaneously adhering the cover member to the plate.

* * * * *